United States Patent [19]

Dotsko

[11] 4,193,211
[45] Mar. 18, 1980

[54] MODULAR TERRAIN MODEL BOARD ASSEMBLY AND METHOD OF BUILDING SAME

[75] Inventor: Martin Dotsko, Binghamton, N.Y.

[73] Assignee: The Singer Company, Binghamton, N.Y.

[21] Appl. No.: 934,353

[22] Filed: Aug. 17, 1978

[51] Int. Cl.² .............................................. G09B 25/08
[52] U.S. Cl. ................................... 35/12 N; 35/12 R; 35/41; 156/63; 156/304; 156/305; 428/48; 428/58
[58] Field of Search ................. 35/12 R, 12 N, 12 W, 35/12 L, 26, 41; 52/98, 173; 49/482; 206/613, 616, 617, 631, 633; 156/63, 304, 305; 428/48, 58; 96/43; 93/1 TS

[56] References Cited

U.S. PATENT DOCUMENTS

| | | | |
|---|---|---|---|
| Re. 29,377 | 8/1977 | O'Brill | 206/634 X |
| 2,895,865 | 7/1959 | Humphner | 206/633 X |
| 2,959,779 | 11/1960 | Miller et al. | 35/12 N |
| 2,961,772 | 11/1960 | Birdseye et al. | 35/41 X |
| 3,052,753 | 9/1962 | Schwarz et al. | 35/12 N |
| 3,188,911 | 6/1965 | Eisenberg et al. | 35/41 X |
| 3,494,538 | 2/1970 | Matthews | 206/616 X |
| 3,670,426 | 6/1972 | Horowitz | 35/12 N |
| 3,742,620 | 7/1973 | Knoll | 35/26 X |
| 3,783,082 | 1/1974 | Almog | 428/48 |
| 3,810,813 | 5/1974 | Ellis | 206/631 X |

Primary Examiner—Vance Y. Hum
Attorney, Agent, or Firm—James C. Kesterson; Jeff Rothenberg

[57] ABSTRACT

A terrain model board and method of construction for use with the closed circuit television display system of a vehicle simulator is disclosed. According to this invention a multiplicity of panels containing the detail of a simulated terrain are joined together in a manner which allows quick and easy disassembly of one or all of the panels. A packing strip having a cord secured to its top surface is inserted into the spaces between adjoining panels prior to filling the spaces or seams with an elastic and adhesive seam filling compound. Thus, one or more of the panels can easily be removed for repair or replacement by simply gripping the string and pulling it up and along the seam thereby cutting through the adhesive.

8 Claims, 4 Drawing Figures

MODULAR TERRAIN MODEL BOARD ASSEMBLY AND METHOD OF BUILDING SAME

BACKGROUND OF THE INVENTION

This invention relates to closed circuit visual display systems used with vehicular simulation devices for training operators such as pilots, drivers, etc. More particularly, the invention relates to terrain model boards viewed by the closed-circuit television camera of such a system and further relates to a method of fabricating such terrain model boards to facilitate disassembly, alteration, and/or repair of the terrain model board.

Visual display systems used with aircraft simulation and comprising a closed-circuit television system in which a television camera is moved about a three-dimensional terrain model have gained widespread use in the field of aircraft simulation. Apparatus and techniques for controlling camera movement, as well as transmitting and displaying the image of the terrain model are disclosed in U.S. Pat. Nos. 2,959,779; 3,052,753 and 3,670,426. The three-dimensional model board which is scanned by the TV camera as the camera follows a simulated course of flight determined by the student pilot as the trainee pilot "flys" the simulation aircraft is fashioned painstakingly with rigorous adherence to correct scale factors so that the trainee can properly judge altitude, altitude rates, slant range, closure rates, etc. The terrain model board generally comprises a multiplicity of separate panels which when joined together create a large section of terrain that may include mountains, rivers, buildings, airports, runways, etc., and may have an overall dimension on the order of twenty feet by forty feet. The scale of such a terrain model board is so large that a 20×40 foot model might easily represent a section of terrain on the order of six miles by twelve miles. Because of this large scale factor, it will be appreciated that if a pilot trainee was performing a maneuver that would in real life bring his aircraft within 200 feet of the ground, the television probe or lens would be "flying" above the model board at about 1.6 inches. Similarly, if the pilot were to be performing a maneuver, such as landing, that would bring his eyepoint within twenty feet of the ground, the television probe or lens would only be 0.16 of an inch away from the model board. Thus, it can be seen that as the camera probe moves rapidly along the model board at such close distances, a slight mistake on the part of the trainee pilot or an irregularity in the model board could result in the probe making contact with or "crashing" into the model board. Such crashing almost always results in damage to either the camera probe or the model board. Even though the detail terrain model boards are by no means inexpensive, when compared to the cost of a camera probe it is much more desirable that any damage that results because of the crash be experienced by the model board and not the probe. It is also not uncommon, for various reasons that a portion of the model board be altered to simulate a different terrain or to reflect different and new buidings, etc. It may also be desired to completely disassemble a terrain model board so that the entire simulator complex can more readily be moved to a new location. Consequently, for purposes of repair, alteration and easy assembly and disassembly it is often necessary to remove one or more of the individual panels which make up a terrain model board. Therefore, it is an object of this invention to provide a terrain model board which is built up from a multiplicity of easily assembled and easily separable panels.

It is a further object of this invention to provide an improved method of joining a multiplicity of individual panels making up a terrain model board to provide for quick and inexpensive disassembly of the individual panels making up the terrain model board.

It is still another object of the invention to provide a new method of assembling a multiplicity of panels to make up a terrain model board which allows easily assembly and disassembly without requiring special tools.

To accomplish the above mentioned objects as well as other objects which will become evident from the following drawings and detailed description, the present invention discloses a three-dimensional terrain model board and method of construction which comprises the steps of locating or placing the panels to be joined at a small spaced distance from each other such that the panels when viewed together appear as one larger continuous area. A packing strip is then inserted in the spaced distance or seam between adjoining panels. This packing strip is in contact with extended edges of adjoining panels and below the surface of the panel containing the simulated terrain. An adhesive or elastic compound is then used to fill the seam up to the level of the terrain surface to provide an overall continuous simulated terrain surface. The packing strip includes a cord such as a string or wire which is cemented to the top surface so that a panel may be readily removed from the composite terrain model board by simply gripping the cord and pulling up and along the seam thereby cutting through the seam filling compound and separating the panel.

For a further understanding of the nature and objects of the invention reference should be made to the following detailed description taken in connection with the accompanying drawings, in which.

Figure 1:
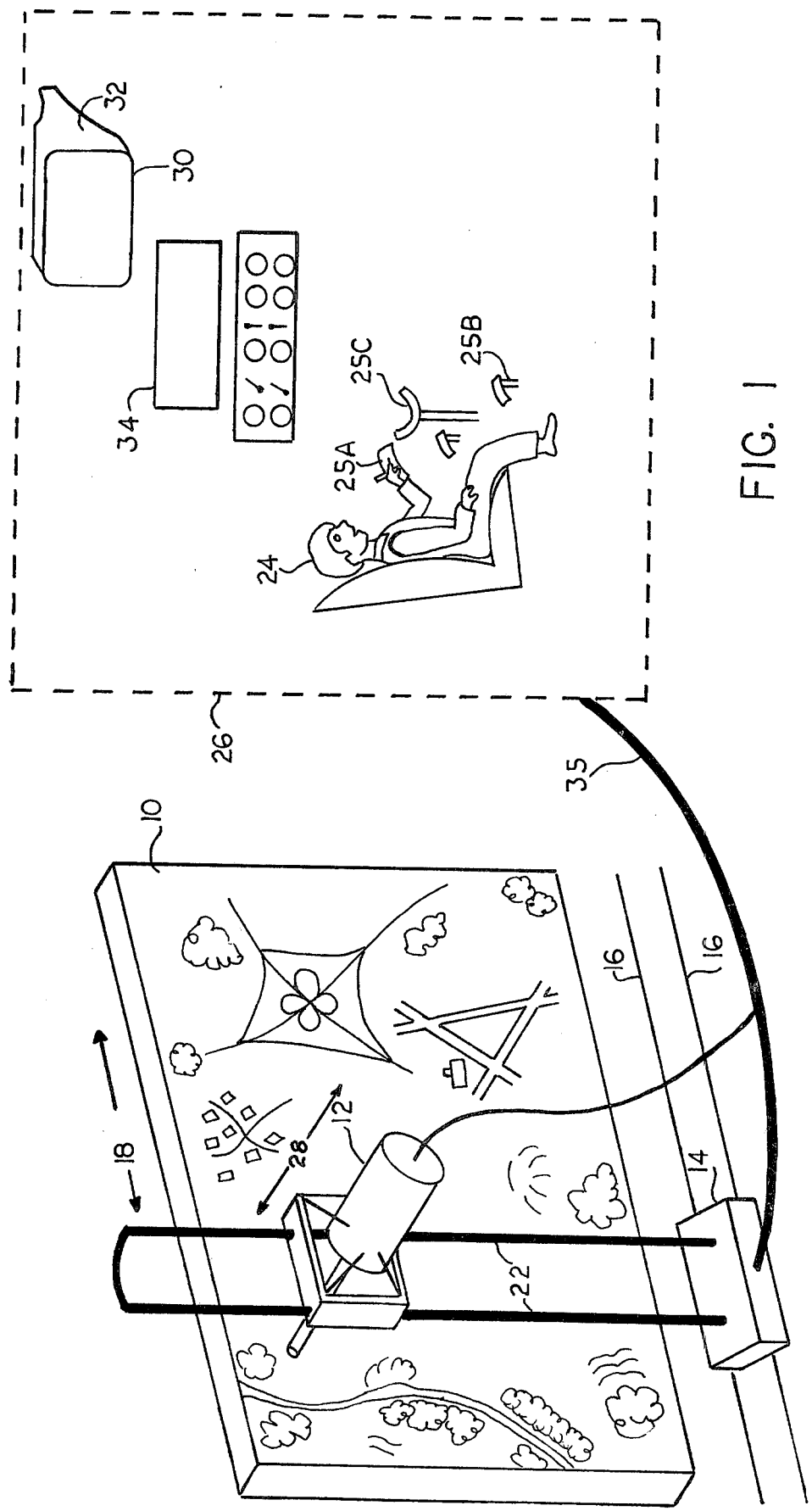
FIG. 1 is a simplified pictorial representation of a simulator complex having a camera model visual system and using a terrain model board built according to the method of this invention.

Referring now to FIG. 1 there is shown a simplified block diagram of a camera model visual system using the terrain model board 10 of this invention. As is shown, terrain model board 10 is typically oriented in a vertical plane to conserve space. Camera 12 is attached to gantry 14 which moves along tracks 16 to allow camera 12 to cover the long dimension 18 of model board 10. To cover the short dimension, shown as 20, camera 12 moves up and down rails 22 which are attached to gantry 14. Thus, as the pilot trainee 24 manipulates the controls 25 (such as for example the throttle 25A, rudder pedals 25B and control column 25C) of simulator 26, the camera is "flown" over the model board 12 as though it were the aircraft. Motion along axis 28 of the camera which determines the distance of camera 12 from model board 10 simulates the altitude of the aircraft above the earth. The scene picked up by camera 12 is then typically displayed on the screen 30 of a CRT 32 mounted behind the windshield 34 of the simulator. Control signals from the simulator 26 which control the location of camera 12 and the signals displayed on CRT 32 from camera 12 are carried by cable 35. Therefore as is well recognized by those skilled in the art, a visual scene representative of what a pilot would see as he flys his aircraft over a terrain of the type represented on the model board 10 is displayed on screen 30 of CRT 32.

Figure 2:
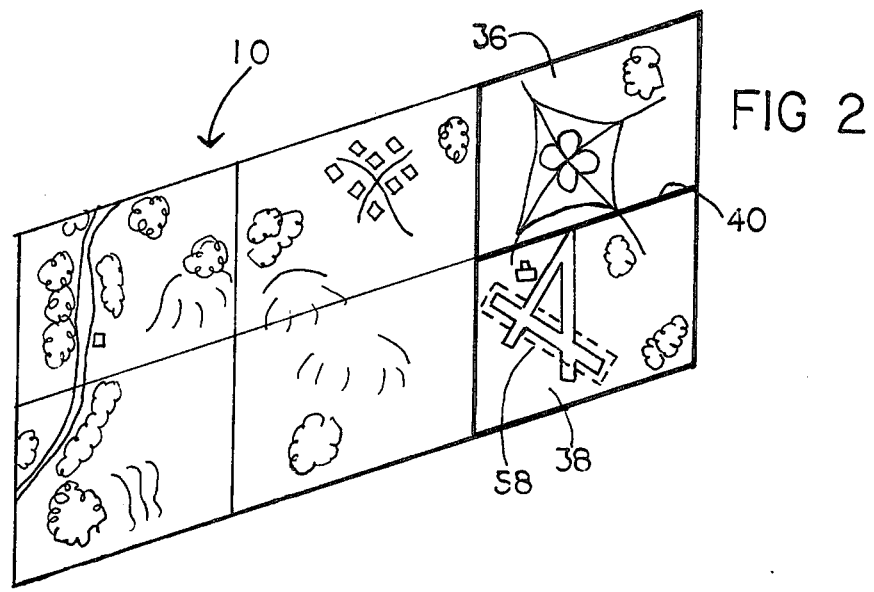
FIG. 2 is a front view of the terrain model board of FIG. 1 which further shows the seams between the multiplicity of panels comprising the terrain model board.

As is illustrated in FIG. 2, terrain model board 10 may be made up of a large number of individual panels such as panels 36 and 38. Each of these individual panels, of of course represents a different section of the simulated terrain so that when the panels are joined together the desired overall terrain is simulated. It will be appreciated, therefore, that each of the many panels are joined together by seams such as seam 40 between panels 36 and 38.

Figure 3:
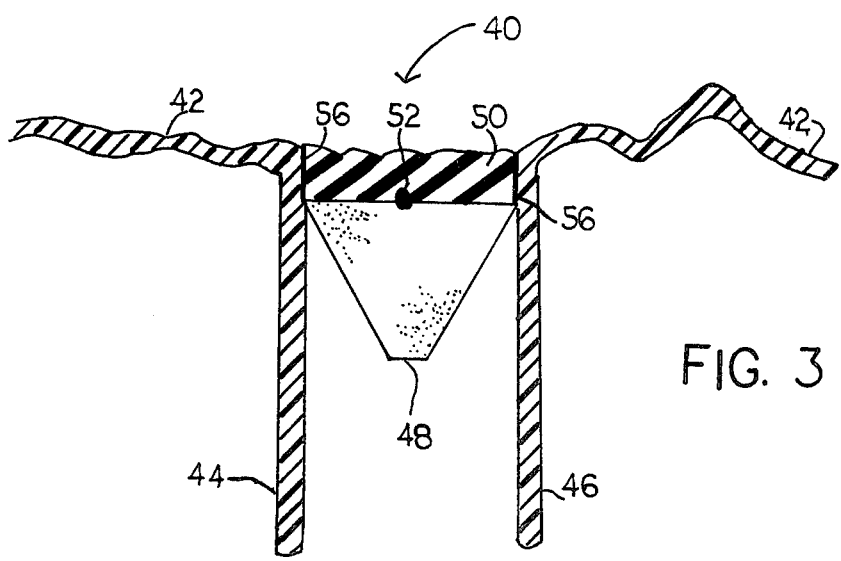
FIG. 3 is a detailed cross-section of one of the seams of FIG. 2 which incorporates the teachings of the present invention.

Referring now to FIG. 3, there is shown a cross-section of seam 40 between terrain panels 36 and 38. In the past, panels such as those shown in 36 and 38 were typically joined together by a cement or seam filling compound which had to be removed by the use of a coarse tooth saw whenever it was necessary to remove a panel for alteration or repair. In this invention, it is seen that the individual panels such as 36 and 38 are made of a material such as fiber glass, plaster or other material which can readily be formed to represent hills, mountains, valleys and other normal earthtype terrain. In the example shown in FIG. 3, each of the individual panels includes a terrain face 42 which contains the desired topography, and extended edges of the panel such as edges 44 and 46. In this example, the entire panel including the terrain face 42 and the edges 44 and 46 are all made of fiber glass.

Figure 4:
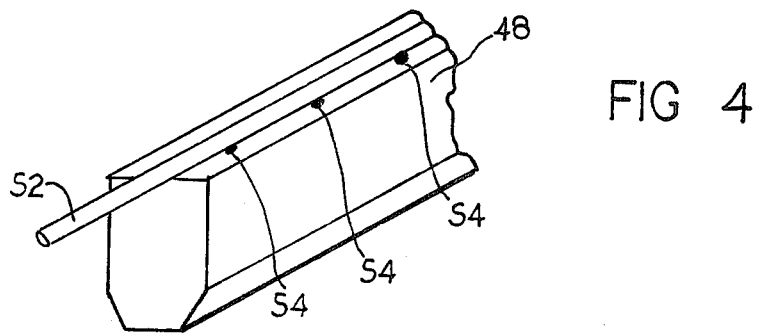
FIG. 4 represents the packing strip and string combination built according to the present invention and inserted in the seam of FIG. 2.

As is shown, once the individual panels are set in place, packing material 48 is inserted between the individual panels below the surface of the terrain face. The distance between the surface of the panel and packing 48 is selected to provide a thickness of seam filling compound 50 which will provide adequate adhesion, etc. A suitable thickness will normally be on the order of $\frac{1}{8}$ to $\frac{1}{2}$ inches. Packing material 48 is typically made of such materials as felt or rubber. Referring also to FIG. 4, it is seen that cord 52 is secured to the top of the packing material 48 at spaced intevals by a cement or adhesive 54 prior to placing packing material 48 between the individual panels. Cord 52 may either be a small diameter strong string, or a wire. Seam filling 50 is then applied between each of the adjoining panels to make a continuous surface between adjoining panels to avoid the appearance of a deep canyon or chasm in the simulated terrain.

Although, almost any type of commercial crack filing compound that has adhesive quality and sets up quickly such as buytl rubber, putty or the like could be used as seam filling compound 50 it has been found that it is desirable that the seam filling compound maintain excellent adhesiveness and elasticity for many years. An especially suitable seam filling compound 50, may be prepared by mixing according to the following formulas: 100 grams of a commercially available silicone rubber compound such as for example GE RTV-11; 57 grams of a commercially available aluminum powder such as is available from the Devcon Company; 25 drops of dibutyl tin dilaurate also available from GE; and six tablespoons of CaB-O-Sil. As an alternate to the aluminum powder, it has been found that processed wood flour also provides good results, and also results in a higher dielectric constant more closely matching the dielectric constant of the fiber glass used in terrain model boards. Also shown is primer material 56 which is applied to the edges of the individual panels 36 and 38 prior to the application of the seam filling compound 50. Thus, it will be appreciated that seam filling compound will adhere securely to panels 36 and 38 where the primer 56 has been applied, but will not adhere securely to the packing material 48 as no primer was applied. Any commercial silicone primer may be used on the panels, such as for example GE Silicone Primer SS4004.

Thus, it can be seen that according to this invention the panels are joined together by means of the seam filling compound 50 which is applied between the panels and on top of packing material 48 and string 52. It should therefore be appreciated that the seam filling compound 50 as was discussed above will remain elastic with excellent adhesion for many years; however, if it is desirable or necessary to remove a panel for purposes of repair or alteration the task is greatly simplified by the present invention. For example, it will not be necessary to use a coarse tooth saw to cut out the seam filling compound 50 as was required prior to this invention. Instead, to separate the panels joined by the method of this ivention, it is only necessary to securely grip cord 52 and pull the cord through the seam filling compound 50 thereby slicing the compound into two pieces between the two panels. It will also be appreciated that as the cord is pulled it will break the adhesive bond holding it to packing 48 at the same time it cuts through the seam filling compound. Once the panel is removed it is then a very simple and easy manner to clean the edges of the removed panel and the adjacent panels so that a new or repaired panel can be replaced in the position of the panel which was removed.

As is also shown by panel 38, it may be desirable to include an insert section of a panel, which insert has minute detail well beyond that of the remainder of the panels in the complete terrain model board. For example, the landing strip or landing field contained by insert 58 is in much greater need of more detail when the pilot is simulating a landing since the pilot's simulated eyepoint will be significantly closer to the model board than at a simulated altitude. Thus, details that were completely unnecessary at high altitudes are essential at these very low altitudes. It will be appreciated that these detailed inserts, may be secured to the appropriate panel by the same joining method that has been described heretofore.

Although the present invention has been described with respect to specific methods and apparatus, it is not intended that such specific reference be considered limitations upon the scope of the invention except insofar as is set forth in the following claims:

I claim:

1. A method of joining a multiplicity of panels making up the three-dimensional model board used with a closed-circuit television visual display system of a vehicle simulator comprising the steps of:
    placing the edges of two panels representing contiguous areas of simulated terrain substantially parallel and at a spaced distance from each other such that when said two panels are viewed together they represent one larger continuous area of simulated terrain, each of said panels of terrain including a surface area and extended edges around the perimeter of said panels;

inserting a packing strip in said spaced distance, below said surface area of each said panel and in contact with said parallel edges, said packing strip further including a cord attached to a surface of said packing strip at spaced intervals; and filling the seam defined by said edges of said panels and said packing strip with an adhesive compound up to a level of said surface areas of said panels to obtain a continuous terrain between said two panels, said adhesive compound having qualities such that said cord will separate from said packing strip and cut through said adhesive compound when pulled up from said packing strip and along said seam.

2. The method of claim 1 and further including the step of applying a primer compound to the parallel edges of said panels to increase adhesion of said adhesive compound to said panels.

3. The method of claim 1 including the step of selecting said adhesive compound from the group consisting of putty, silicone rubber, and butyl rubber.

4. The method of claim 1 including the step of making said packing strip of a material selected from the group consisting of felt and rubber.

5. A three-dimensional terrain model board made up of a multiplicity of panels for use with a close-circuit television visual display system of a vehicle simulator comprising;

a multiplicity of panels placed such that the edges of two panels are substantially parallel and at a spaced distance from each other such that when said two panels are viewed together they represent a larger continuous area of simulated terrain, said panels including a surface area simulating said terrain and extended edges around the perimeter of said panels;

a packing strip inserted in said spaced distance between said edges of two parallel panels representing contiguous areas of a simulated terrain, said packing strip being placed below said surface area of each panel and in contact with said parallel edges and further including a cord detachably secured to a surface of said packing strip at spaced intervals; and an adhesive compound applied to the seam defined by said edges of said panel and said packing strip, said adhesive compound applied in sufficient quantity to fill said seam up to said surface area of said panels to obtain a continuous terrain between said two contiguous panels, said adhesive compound, having qualities such that said cord will separate from said packing strip and cut through said adhesive compound when pulled up from said packing strip and along said seam.

6. The three-dimensional terrain model board of claim 5 and further including priming compound applied to said parallel edges to increase the adhesion of said adhesive compound to said panels.

7. The three-dimensional terrain model board of claim 5 wherein said adhesive compound is selected from the group consisting of putty, silicone rubber, and butyl rubber.

8. The three-dimensional terrain model board of claim 5 wherein said packing strip is made of a material selected from a group consisting of felt and rubber.

* * * * *